(12) United States Patent
Chhabra et al.

(10) Patent No.: US 11,301,325 B2
(45) Date of Patent: Apr. 12, 2022

(54) MEMORY IN INTEGRITY PERFORMANCE ENHANCEMENT SYSTEMS AND METHODS

(71) Applicant: Intel Corporation, Santa Clara, CA (US)

(72) Inventors: Siddhartha Chhabra, Portland, OR (US); Ronald Perez, Piedmont, CA (US); Hsing-Min Chen, Santa Clara, CA (US); Manjula Peddireddy, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 16/888,449

(22) Filed: May 29, 2020

(65) Prior Publication Data

US 2021/0374000 A1 Dec. 2, 2021

(51) Int. Cl.
*G06F 11/10* (2006.01)
*H04L 9/32* (2006.01)

(52) U.S. Cl.
CPC ........ *G06F 11/1076* (2013.01); *H04L 9/3242* (2013.01)

(58) Field of Classification Search
CPC ............................ G06F 11/1076; H04L 9/3242
See application file for complete search history.

(56) References Cited

U.S. PATENT DOCUMENTS

| | | |
|---|---|---|
| 2011/0239088 A1 | 9/2011 | Post |
| 2015/0082122 A1 | 3/2015 | Udipi et al. |
| 2017/0091119 A1* | 3/2017 | Chhabra ................. G06F 12/08 |
| 2018/0189186 A1* | 7/2018 | Chhabra ................. G06F 21/72 |
| 2018/0210787 A1 | 7/2018 | Bains et al. |
| 2019/0043600 A1* | 2/2019 | Saileshwar ......... G06F 11/1048 |

OTHER PUBLICATIONS

EPO; Extended European Search Report issued in EP Patent Application No. 20206934.0, dated Mar. 12, 2021; 8 pages.

* cited by examiner

*Primary Examiner* — Kyle Vallecillo
(74) *Attorney, Agent, or Firm* — Alliance IP, LLC

(57) ABSTRACT

A write request causes controller circuitry to write an encrypted data line and First Tier metadata portion including MAC data and a first portion of ECC data to a first memory circuitry portion and a second portion of ECC data to a sequestered, second memory circuitry portion. A read request causes the controller circuitry to read the encrypted data line and the First Tier metadata portion from the first memory circuitry portion. Using the first portion of the ECC data in the First Tier metadata portion, the controller circuitry determines if an error exists in the encrypted data line. If no error is detected, the controller circuitry decrypts and verifies the data line using the MAC data in the First Tier metadata portion. If an error in the data line is detected, the Second Tier metadata portion, is fetched from the sequestered, second memory circuitry portion and the error corrected.

23 Claims, 7 Drawing Sheets

| CONFIGURATION | | | | ECC | MAC | 2LM | STORAGE OVERHEAD |
|---|---|---|---|---|---|---|---|
| | TIER I METADATA 132 | | TIER II METADATA 142 | | | | |
| 1. | ECC (96b) 138 | MAC (28b) 136 | OTHER (4b) | 96b | 28b | NO | 0% |
| 2. | ECC-TIER I (64b) 138₁ | MAC (34b) 136 | OTHER (4b) | ECC-TIER II (16b) 138₂ | 96b | >28b | YES | 3.125% |
| 3. | ECC-TIER I (64b) 138₁ | MAC (50b) 136 | OTHER (14b) | ECC-TIER II (32b) 138₂ | 96b | 50b | YES | 6.25% |
| 4. | ECC-TIER I (64b) 138₁ | MAC (55b) 136 | OTHER (9b) | ECC-TIER II (64b) 138₂ | 128b | 55/56b | YES | 12.5% |

Metadata in ECC device | Metadata in sequestered memory

FIG. 3

MEMORY IN INTEGRITY PERFORMANCE ENHANCEMENT SYSTEMS AND METHODS

TECHNICAL FIELD

The present disclosure relates to memory integrity, more specifically, this disclosure relates to error detection and correction systems having reduced overhead requirements.

BACKGROUND

Cloud security providers (CSPs) use cryptographic isolation for the customer workloads running on their platform. Various cryptographic isolation methods have been implemented to meet these requirements for the cloud providers, such as Secure Memory Encryption (SME) and Secure Encrypted Virtualization (SEV). Memory integrity operates by associating a cryptographic message authentication code (MAC) with each data line in memory. The MAC is generated when data is written to memory and verified when the data is read from memory. If data was modified, either when resident in memory or transitioning over the memory bus, the MAC will not match and result in the modification attack being detected (a security exception can then be signaled to notify software of the attack). Traditional integrity approaches can suffer from significant performance overheads as the MAC associated with each data line must be loaded on each access and verified/updated depending on the type of memory access. This additional access results in storage, performance, and bandwidth overheads.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 is a table providing a comparison of various metadata configurations, in accordance with at least one embodiment described herein;

Figure 1:
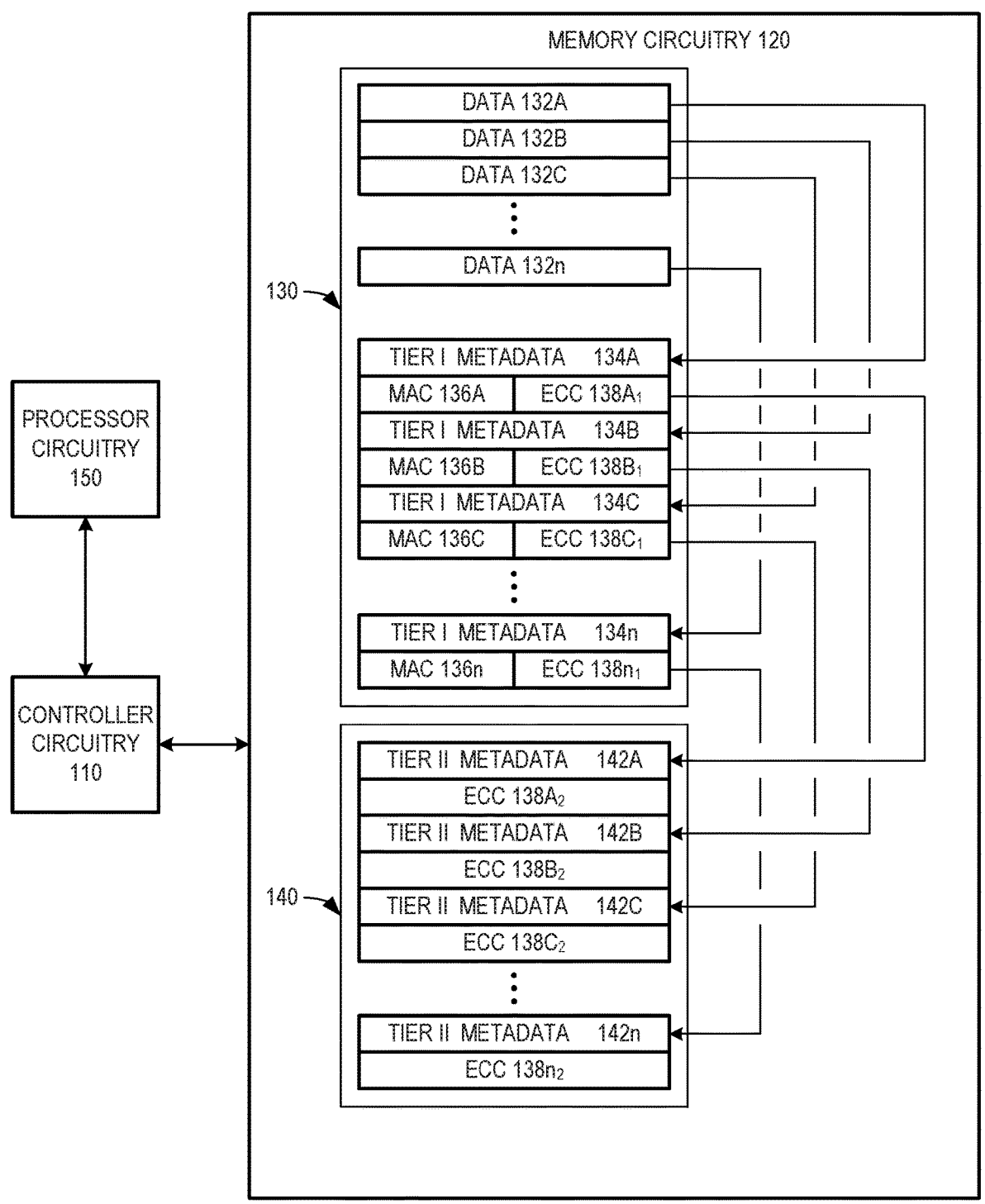
FIG. 1 is a block diagram of an illustrative system that includes controller circuitry and memory circuitry to store a plurality of data lines 132A-132n, a plurality of First Tier metadata 134A-134n, each associated with a corresponding one of the plurality of data lines 132A-132n, and a plurality of Second Tier metadata 142A-142n, each associated with a corresponding one of the plurality of data lines 132A-132n, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein provide a memory integrity architecture that features full error correction capabilities and high-strength memory integrity without introducing the performance overheads of traditional memory integrity approaches. The systems and methods disclosed herein use extended Reed-Solomon codes to provide error correction code (ECC) that includes error detection data and error correction data. The use of Reed-Solomon codes advantageously permits splitting the ECC into two tiers (hereinafter, "First Tier" and "Second Tier"). First Tier metadata, including at least the error detection data portion of the error correct code (ECC) and message authentication code (MAC) data, is stored in memory circuitry at the same location as the associated data line, such that at least the error detection data portion of the ECC data and the MAC data are read during each READ operation on the data line. For example, the First Tier metadata may be stored or otherwise retained in the error correction code (ECC) bits for a cacheline that are fetched with the cacheline responsive to a READ operation. The First Tier metadata may, at times, also include other data such as security-related metadata, and some or all of the error correction data. Second Tier metadata includes error correction data and is stored in a separate or sequestered location in the memory circuitry. The Second Tier metadata includes at least a portion of the error correction data portion of the ECC data and is typically only accessed when the memory controller circuitry detects an error in the data line. Thus, First Tier metadata may be used to store performance sensitive metadata (e.g., the error detection data portion and, possibly, some of the error correction data portion of the ECC, and MAC data) and Second Tier metadata uses sequestered memory to store the metadata associated with a data line that is off the performance critical path (e.g., the error correction data portion of the ECC). System performance is enhanced by obviating the need to read the MAC data and both the error detection data and error correction data during each read operation—instead, the MAC data and the error detection data (i.e., the First Tier metadata) are read during each read operation and only when a data error occurs is the full error correction data (i.e., the First Tier metadata AND the Second Tier metadata) read. Beneficially, the systems and methods disclosed herein permit support security and integrity with 100% SDDC/chipkill and provide space for other metadata such as tagging and multi-level memories A data storage system is provided. The system may include: memory circuitry; controller circuitry to, for each of a plurality of lines of data stored in memory circuitry: generate metadata that includes: data representative of a cryptographic message authentication code associated with the respective line of data; and data representative of an error code associated with the respective line of data, the error correction code including at least error detection data associated with the respective line of data and error correction data associated with the respective line of data; and apportion the metadata into a First Tier metadata portion stored in a first location in the memory circuitry proximate the respective line of data in the memory circuitry and a Second Tier metadata portion stored in a second location in the memory circuitry remote from the respective line of data; wherein the First Tier metadata portion includes at least the error detection data portion and the message authentication code portion associated with the respective line of data; and wherein the Second Tier metadata portion includes at least a portion of the error correction data portion associated with the respective line of data.

A data storage method is provided. The method may include: generating, by controller circuitry, metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and apportioning, by the controller circuitry, the metadata into a First Tier metadata portion stored in a first memory location in the memory circuitry proximate the respective line of data and a Second Tier metadata portion stored in a second location in the memory circuitry remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

A non-transitory storage device that includes instructions is provided. The instructions, when executed by controller circuitry, cause the controller circuitry to: generate metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and apportion the metadata into a First Tier metadata portion stored in a first memory location in the memory circuitry proximate the respective line of data and a Second Tier metadata portion stored in a second location in the memory circuitry remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

A data storage system is provided. The system may include: means for generating metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and means for apportioning the metadata into a First Tier metadata portion stored in a first memory location in the memory circuitry proximate the respective line of data and a Second Tier metadata portion stored in a second location in the memory circuitry remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with data storage and retrieval have not been shown or described in detail to avoid unnecessarily obscuring descriptions of the embodiments. Although the following disclosure is directed to specific embodiments utilizing electromagnetic memory such as random access memory (RAM); dual data rate RAM (DDR-RAM); static RAM (SRAM); and dynamic RAM (DRAM), those of ordinary skill in the computer arts will readily appreciate the applicability of the systems and methods disclosed herein to other data storage structures such as: magneto-resistive RAM (MRAM); spin transfer torque MRAM (STT-MRAM); resistive RAM (ReRAM); quantum storage devices; molecular storage devices; and similar.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

FIG. 1 is a block diagram of an illustrative system 100 that includes controller circuitry 110 and memory circuitry 120 to store or otherwise retain a plurality of data lines 132A-132n (collectively "data lines 132"), such as a plurality of cachelines; a plurality of First Tier metadata 134A-134n (collectively, "First Tier metadata 134"), each associated with a corresponding one of the plurality of data lines 132A-132n; and Second Tier metadata 142A-142n (collectively, "Second Tier metadata 142"), each associated with a corresponding one of the plurality of data lines 132A-132n, in accordance with at least one embodiment described herein. As depicted in FIG. 1, the system 100 also includes processor circuitry 150 to execute one or more applications that perform memory operations such as memory read and memory write operations.

As depicted in FIG. 1, each of the plurality of First Tier metadata 134A-134n includes a corresponding one of a plurality of message authentication code (MAC) data 136A-136n (collectively, "MAC data 136"), each associated with a corresponding one of the plurality of data lines 132A-132n. The First Tier metadata 134A-134n also includes at least a first portion of the error correction code (ECC) data $138A_1$-$138_m$ (collectively, "first ECC data portions $138_1$"), each associated with a corresponding one of the data lines 132A-132n. In some embodiments, the first ECC data portion $138A_1$-$138n_1$ includes at least the error detection data portion of the respective ECC 138A-138n. In other embodiments, the first ECC data portion $138A_1$-$138n_1$ includes at least the error detection data portion of the respective ECC 138A-138n and at least a portion of the error correction data portion of the respective ECC 138A-138n. Also as depicted in FIG. 1, the Second Tier metadata 142A-142n includes a second portion of the error correction code (ECC) $138A_2$-$138n_2$ (collectively, "second ECC data portions $138_2$"), each associated with a corresponding one of the data lines 132A-132n.

In embodiments, in response to execution of an instruction by the processor circuitry 150 that includes a memory write operation, the controller circuitry 110 may encrypt the data line 132A and generate message authentication code (MAC) data 136A that is associated with the data line 132A. The controller circuitry 110 may also generate an error correction code (ECC) 138A, such as a Reed-Solomon ECC, that includes an error detection data portion and an error correction data portion, both associated with data line 132A. The controller circuitry 110 stores the data line 132A and the First Tier metadata 134A, including at least the MAC data 136A and the first ECC data portion $138A_1$ in a first portion of the memory circuitry 130. The controller circuitry 110 stores the Second Tier metadata 142A, including the second ECC data portion $138A_2$ in a sequestered second portion of the memory circuitry 140 that is remote from the first portion of the memory circuitry 130.

In embodiments, in response to execution of an instruction by the processor circuitry 150 that includes a memory read operation, the controller circuitry 110 may fetch the data line 132A and the First Tier metadata 134A, including the MAC data 136A and the first ECC data portion $138A_1$ associated with the fetched data line 132A. The controller circuitry 110 uses the error detection data portion included in the first ECC data portion $138A_1$ to detect if errors exist in the fetched data 132A. If no errors are detected, the controller circuitry 110 decrypts and verifies the fetched data 132A using the MAC data 136A included in the First Tier metadata 134A. Once verified by the controller circuitry 110, the verified data line 132A is then passed to the processor circuitry 150. If the fetched data 132A cannot be verified by the controller circuitry 110 using the MAC data 136A, the controller circuitry 110 returns null data and the processor circuitry 150 throws an exception. If the controller circuitry 110 detects an error in the retrieved data line 132A, the controller circuitry 110 retrieves, from the second, sequestered, memory circuitry 140, the Second Tier metadata 142A. The controller circuitry 110 uses the error correction data portion included in the second ECC data portion $138A_2$ to correct the data line 132A prior to decrypting and verifying the fetched data 132A using the MAC data 136A included in the First Tier metadata 134A included with the fetch of the data line 132A.

In embodiments, each of the data lines 132A-132n may include one or more cachelines in cache memory circuitry operably coupled to the processor circuitry 150. For example, each of the data lines 132A-132n may include one or more level 1 (L1) cachelines; one or more level 2 (L2) cachelines; one or more last level cache (LLC) lines; or combinations thereof. Each of the data lines 132A-132n may include any number of bytes. In embodiments, each of the data lines 132A-132n may have the same or different number of bytes. For example, each of data lines 132A-132n may include: 32 bytes; 64 bytes; 128 bytes; or 256 bytes.

The First Tier metadata 134A-134n includes the MAC data 136A-136n and the first ECC data portion $138A_1$-$138n_1$. In addition, in some embodiments, the First Tier metadata 134A-134n may include other data such as security data that includes but is not limited to: tag and state data, directory/poison data, and similar security related data. In some embodiments, the first ECC data portion $138A_1$-$138n_1$ may include only the error detection portion of the ECC data 138A-138n corresponding to the fetched data line 132A-132n (i.e., the first ECC data portion $138A_1$-$138n_1$ may include only the error detection portion of the ECC data 138A-138n). In other embodiments, the first ECC data portion $138A_1$-$138n_1$ may include the error detection portion of the ECC data 138A-138n AND some of the error correction portion of the ECC data 138A-138n corresponding to the fetched data line 132A-132n (i.e., the first ECC data portion $138A_1$-$138n_1$ may include the error detection portion AND at least some of the error correction portion of the ECC data 138A-138n). In yet other embodiments, the first portion of the ECC data $138A_1$-$138n_1$ may include both the error detection portion of the ECC data 138A-138n AND the error correction portion of the ECC data 138A-138n corresponding to the fetched data line 132A-132n (i.e., the first ECC data portion $138A_1$-$138n_1$ may include the error detection portion AND the error correction portion of the ECC data 138A-138n). The First Tier metadata 134A-134n may include any number of bits. For example, the First Tier metadata 134A-134n may include: 64 bits; 96 bits; 128 bits; or 256 bits. The MAC data 136A-136n included in the First Tier metadata 134A-134n may include any number of bits. For example, the MAC data 136A-136n may include: 30 bits or less; 40 bits or less; 50 bits or less; or 60 bits or less. The first portion of the ECC data $138A_1$-$138n_1$ includes error detection data. In some embodiments, the first portion of the ECC data $138A_1$-$138n_1$ includes error detection data and at least a portion of the error correction data. The first ECC data portion $138A_1$-$138n_1$ may include any number of bits. For example, the first ECC data portion $138A_1$-$138n_1$ may include: 32 bits, 64 bits, 96 bits, or 128 bits.

In other embodiments, the First Tier metadata 134A-134n may include the first ECC data portion $138A_1$-$138n_1$ and at least some of the bits included in the second ECC data portion $138A_2$-$138n_2$. In such embodiments, the First Tier metadata 134A-134n may include any number of bits from the second ECC data portion $138A_2$-$138n_2$. For example, the First Tier metadata 134A-134n may include: 8 bits, 16 bits, or 32 bits of the second ECC data portion $138A_2$-$138n_2$.

In yet other embodiments, the First Tier metadata 134A-134n may include the first ECC data portion $138A_1$-$138n_1$ and the second ECC data portion $138A_2$-$138n_2$. In such embodiments, the First Tier metadata 134A-134n may include a total of: 64 bits, 96 bits, or 128 bits of ECC data included in the first ECC data portion $138A_1$-$138n_1$ and the second ECC data portion $138A_2$-$138n_2$.

The Second Tier metadata 142A-142n includes all or a portion of the second ECC data portion $138A_2$-$138n_2$. In embodiments, the second ECC data portion $138A_2$-$138n_2$ may include error correction data that includes any number of bits. For example, the Second Tier metadata 142A-142n may include: 8 bits, 16 bits, 32 bits, 64 bits, 96 bits, or 128 bits of error correction data included in the second ECC data portion $138A_2$-$138n_2$. In some embodiments, the Second Tier metadata 142A-142n may also store all or a portion of the metadata used in performing a READ operation. Such may occur, for example, when the first portion of the memory circuitry 130 is of insufficient size or capacity to store or otherwise retain the First Tier metadata 134A-134n in its entirety.

The controller circuitry 110 includes any number and/or combination of currently available and/or future developed electronic components, optical components, semiconductor device, and/or logic elements capable of performing memory access, error detection, error correction, and verification operations on data communicated to or from the memory circuitry 130. In at least some embodiments, the controller circuitry 110 may include memory controller circuitry. In at least some embodiments, the processor circuitry 150 may provide all or a portion of the controller circuitry 110.

The memory circuitry 120 includes any number and/or combination of currently available and/or future developed electronic components, optical components, semiconductor device, and/or logic elements capable of storing information and/or data. The memory circuitry 120 may include volatile memory, non-volatile memory, or any combination thereof. The memory circuitry 120 may be communicatively coupled to processor circuitry 150 that includes one or more processor core circuits, each processor core circuit capable of contemporaneous execution of one or more threads. In embodiments, the memory circuitry 120 may include cache memory circuitry communicatively coupled to the processor circuitry. In embodiments, the memory circuitry 120 may include level 1 (L1) cache memory circuitry, level 2 (L2) cache memory circuitry, last level cache (LLC) circuitry, or any combination thereof. In other embodiments, all or a portion of the cache memory circuitry 120 may include cache circuitry shared between a plurality of processor core circuits included in the processor circuitry 150.

The processor circuitry 150 may include a general-purpose processor, such as a Core® i3, i5, i7, 2 Duo and Quad, Xeon®, Itanium®, Atom®, or Quark® microprocessor, available from Intel® (Intel Corporation, SANTA CLARA, Calif.), Alternatively, the processor circuitry 150 may include one or more processors from another manufacturer or supplier, such as Advanced Micro Devices (AMD®, Inc.), ARM Holdings® Ltd, MIPS®, etc. The processor circuitry 150 may include a special-purpose processor, such as, for example, a network or communication processor, compression engine, graphics processor, co-processor, embedded processor, or the like. The processor circuitry 150 may be implemented as a single semiconductor package or as a combination of stacked or otherwise interconnected semiconductor packages and/or dies. The processor circuitry 150 may be a part of and/or may be implemented on one or more substrates using any of a number of process technologies, such as, for example, BiCMOS, CMOS, or NMOS.

Figure 2A:
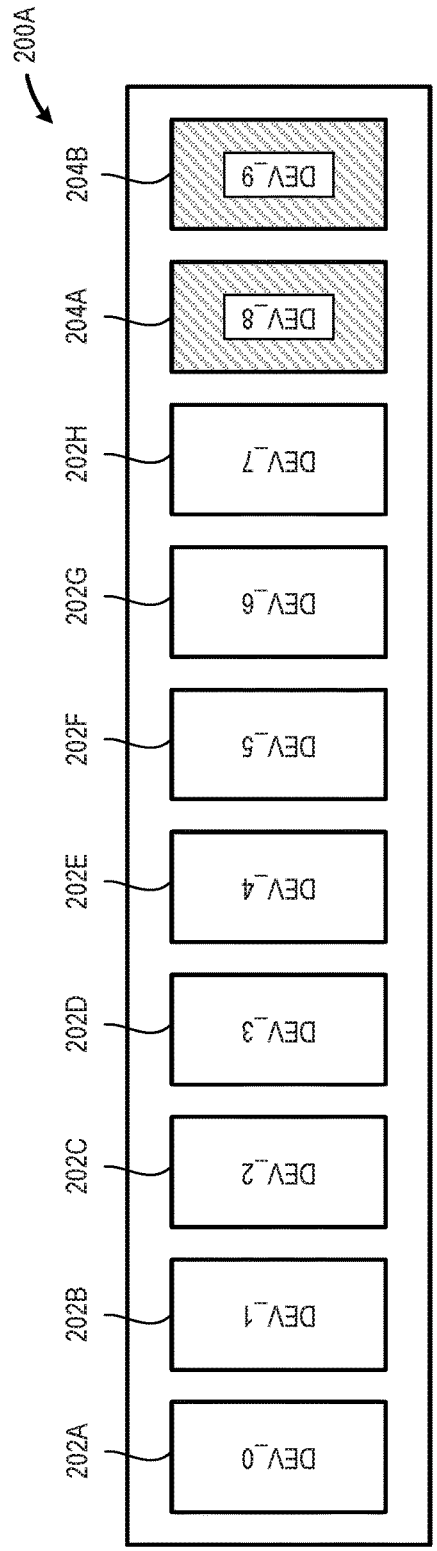
FIG. 2A is an illustrative metadata configuration using a 10×4 DDR5 memory module, in accordance with at least one embodiment described herein.
Figure 2B:
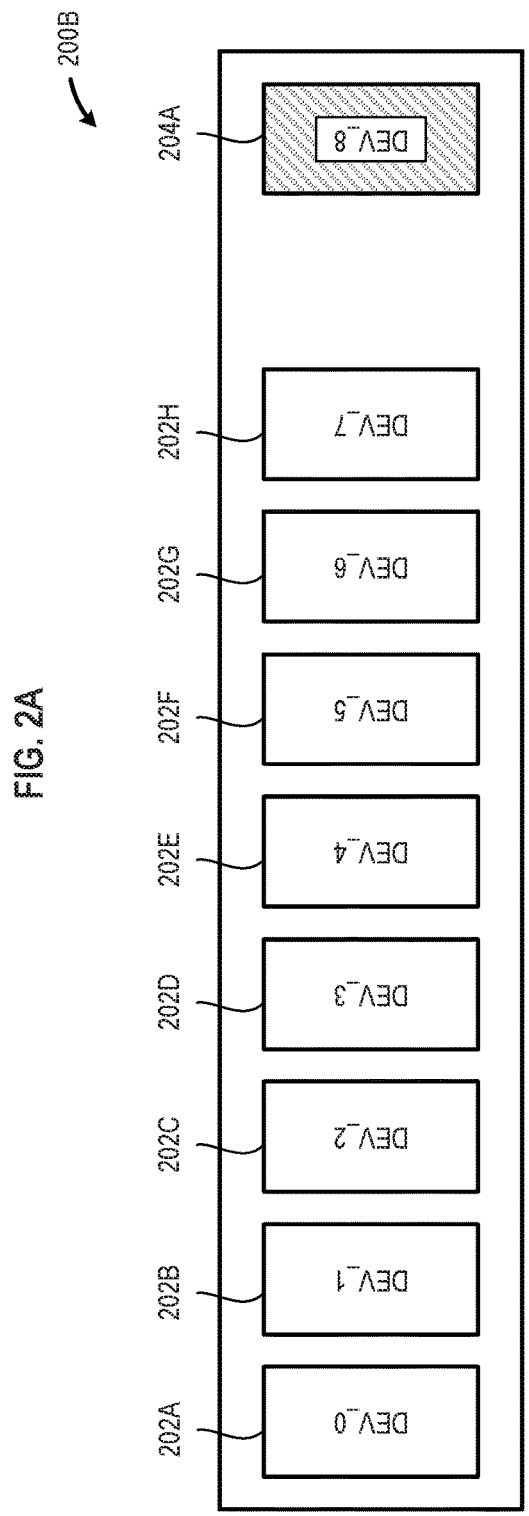
FIG. 2B is another illustrative metadata configuration using a 9×4 DDR5 memory module, in accordance with at least one embodiment described herein.
Figure 2C:
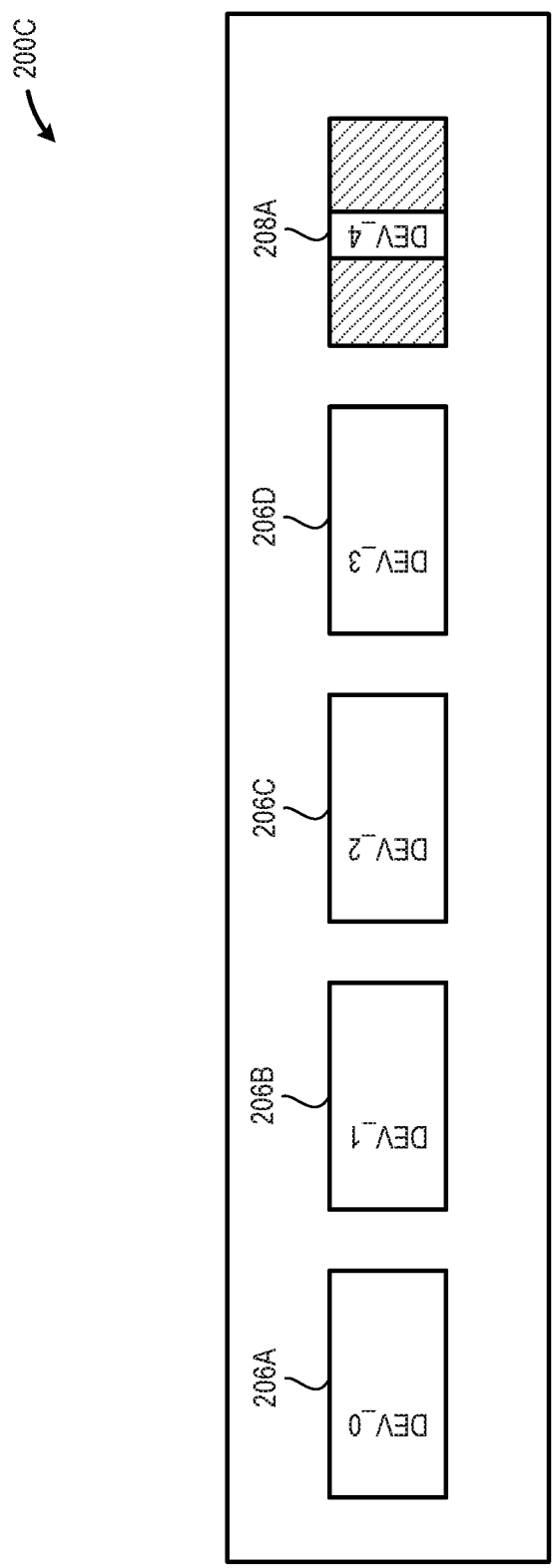
FIG. 2C is yet another illustrative metadata configuration using a 5×8 DDR5 memory module, in accordance with at least one embodiment described herein.

FIG. 2A is an illustrative metadata configuration 200A using a 10×4 DDR5 memory module, in accordance with at least one embodiment described herein. FIG. 2B is another illustrative metadata configuration 200B using a 9×4 DDR5 memory module, in accordance with at least one embodiment described herein. FIG. 2C is yet another illustrative metadata configuration 200C using a 5×8 DDR5 memory module, in accordance with at least one embodiment described herein. Those of skill in the relevant arts will readily appreciate that FIGS. 2A, 2B, and 2C represent illustrative embodiments, and the general principles behind the systems and methods disclosed herein may be readily applied to other memory module configurations with similar impact on system performance as described herein.

As depicted in FIG. 2A, the 10×4 DDR5 memory module 200A includes 10 storage devices, with 8 storage devices 202A-202H dedicated to the storage of data and 2 storage devices 204A and 204B dedicated to the storage of ECC data 138. Each data storage device 202 and each ECC storage device 204 provides 4 bytes of data in each cycle with a 64 byte cache line requiring a total of 16 cycles to be read out of the 10×4 DDR5 memory module 200A. In embodiments, the ×4 storage devices provide 4 bits of data on each rising and falling edge of the clock, so in each cycle there will be 8 B of data and 2B of ECC read (8 data devices providing 1B each and 2 ECC devices providing 1B each). So in a total of 8 cycles, 64B of data and 16B of ECC is read. Similarly, for 5×8, 8B of data and 2B of ECC is read in each cycle (with 5×8, each device gives 8 bits of data on each edge, so a total of 2B in each cycle compared to 1B of data for 10×4 and 9×4). 9×4 provides 8B of data and 1B of ECC each cycle. For a cacheline, there will be 64B of data and 8B of ECC.

Turning next to FIG. 2B, the 9×4 DDR5 memory module 200B includes 9 storage devices, with 8 storage devices 202A-202H dedicated to the storage of data and 1 storage device 204A dedicated to the storage of ECC data 138. Each data storage device 202 and each ECC storage device 204 provides 4 bytes of data in each cycle with a 64 byte cache line again requiring a total of 16 cycles to be read out of the 9×4 DDR5 memory module 200B.

Turning next to FIG. 2C, the 5×8 DDR5 memory module 200C includes 9 storage devices, with 4 storage devices 206A-206D dedicated to the storage of data and 1 storage device 208A dedicated to the storage of ECC data 138. Each data storage device 206 and each ECC storage device 208 provides 8 bytes of data in each cycle with a 128 byte cache line requiring a total of 16 cycles to be read out of the 5×8 DDR5 memory module 200C.

FIG. 3 is a table 300 providing a comparison of various metadata configurations 310, 320, 330, and 340, in accordance with at least one embodiment described herein. As depicted in FIG. 3, a base metadata configuration 310 in which all of the metadata, including a 64 bits of error detection+ correction data, 32 bits of error correction data, 28 bits of MAC data and 4 bits of security (or other) data fit within the 128 bits allowable in the first memory circuitry portion 130. In configuration 310, the MAC data is limited to 28 bits and the security data is limited to 4 bits to fit within the 128 bit constraint of the first memory circuitry portion 130.

Configuration 320 provides a first metadata configuration in which the ECC data 138 is split into a first portion of ECC data $138_1$ stored or otherwise retained in the first memory circuitry portion 130 and a second portion of ECC data $138_2$ stored or otherwise retained in the sequestered, second memory circuitry portion 140. As depicted in configuration 320, the first memory circuitry portion 130 stores or otherwise retains the first ECC data portion $138_1$ (64 bits of error detection+ partial error correction data), and a portion of the second ECC data portion $138_2$ (16 bits of partial error correction data). The sequestered, second memory circuitry portion 140 stores or otherwise retains the remaining portion of the second ECC data portion $138_2$ (16 bits of remaining error correction data). The first memory circuitry portion 130 is read on every memory read operation, thereby permitting error detection capabilities. The controller circuitry 110 accesses the second ECC data portion $138_2$ (16 bits of remaining error correction data) in sequestered, second memory circuitry portion 140 only upon detecting an error. The first memory circuitry portion allocated to the storage of MAC data 136 has increased to 34 bits, providing an additional 6 bits of MAC data storage. Metadata configuration 320 beneficially provides increased capability for storage of other data—as depicted in configuration 320, up to 14 bits of other data. An example of such data includes but is not limited to tag bits used to support multi-level memory circuitry (e.g., three-dimensional cross point memory circuitry "3DXP" memory circuitry as provided by Intel® Corp., SANTA CLARA, Calif.).

Configuration 330 provides a second metadata configuration in which the first memory circuitry portion 130 contains the first portion of ECC data $138_1$ (error detection data portion+ partial correction data portion) and the second, sequestered memory circuitry portion 140 contains the second portion of ECC data $138_2$ (remaining error correction data portion). As depicted in configuration 330, the first memory circuitry portion 130 stores the first ECC data portion $138_1$ (64 bits of error detection data+ partial correction data portion), 50 bits of MAC data, and 14 bits of other data (multi-level memory tag and state, Directory/Poison and other security related metadata). The sequestered second memory circuitry portion 140 stores the second ECC data portion $138_2$ (32 bits of remaining error correction). The first memory circuitry portion 130, including the first ECC data portion $138_1$, containing the error detection data portion, is read on every memory read operation, thereby permitting error detection capabilities. The controller circuitry 110 accesses the second ECC data portion $138_2$ (32 bits of remaining error correction data) in the sequestered, second memory circuitry portion 140 only upon detecting an error. The first memory circuitry portion 130 allocated to the storage of MAC data 136 has increased to 50 bits, providing an additional 22 bits of MAC data storage over the base configuration 310. Similar to metadata configuration 320, metadata configuration 330 beneficially provides increased capability for storage of other data, up to 14 bits of other data.

Configuration 340 provides a third metadata configuration in which the first memory circuitry portion 130 contains the first ECC data portion $138_1$ (error detection+ partial correction data) and the sequestered, second memory circuitry portion 140 contains the second ECC data portion $138_2$ (remaining error correction data). As depicted in configuration 340, the first memory circuitry portion 130 stores the first ECC data portion $138_1$ (64 bits of error detection+ partial correction data), 55 bits of MAC data, and 9 bits of other data (multi-level memory tag and state and other security related metadata). The sequestered, second memory circuitry portion 140 stores the second ECC data portion $138_2$ (64 bits of remaining error correction). The first memory circuitry portion 130, including the first ECC data portion $138_1$, containing the error detection data, is read on every memory read operation, thereby permitting error detection capabilities. The controller circuitry 110 accesses the second ECC data portion $138_2$ (64 bits of remaining error correction data) in sequestered, second memory circuitry portion 140 only upon detecting an error. The first memory circuitry portion 130 allocated to the storage of MAC data 136 has increased to 50 bits, providing enhanced security by providing an additional 27 bits of memory circuitry to store MAC data 136 over the base metadata configuration 310.

Figure 4:
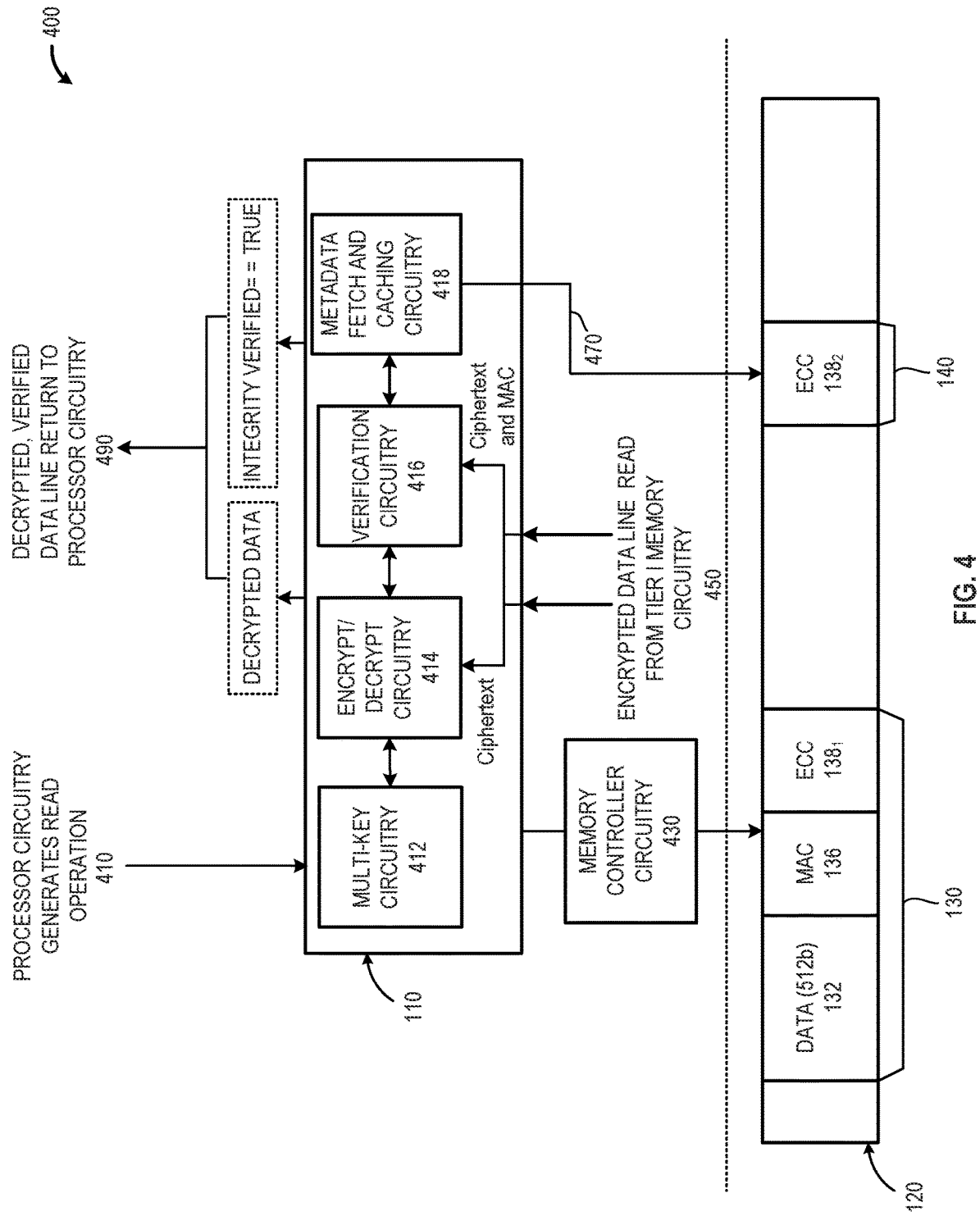
FIG. 4 is a flow diagram of an illustrative method that depicts a read operation using the first portion of the ECC data stored as First Tier metadata 134 and read with the data line and the second portion of the ECC data stored in as Second Tier metadata 142 in sequestered memory circuitry and read only upon detection of an error by the controller circuitry, in accordance with at least one embodiment described herein.

FIG. 4 is a flow diagram of an illustrative method 400 that depicts a read operation using the first ECC data portion $138_1$ stored in the first memory circuitry portion 130 and read with the data line 312 and the first ECC data portion $138_2$ stored in the sequestered, second memory circuitry portion 140 and read only upon detection of an error by the controller circuitry 110, in accordance with at least one embodiment described herein. As depicted in FIG. 4, the controller circuitry 110 may include multi-key circuitry 412, encryption/decryption circuitry 414, verification circuitry 416, and metadata fetch and caching circuitry 418.

Upon receipt of a read request operation 410 generated by an application executed by the processor circuitry 150, the controller circuitry 110 forwards the read request to memory controller circuitry 430. The encrypted data line 132 and the associated First Tier metadata 132, including the MAC data 136, first portion of the ECC data $138_1$, and other data such as multi-level memory tag and state data, is returned 450 to the controller circuitry 110. The controller circuitry 110 first determines whether errors exist in the encrypted data line 132 using the error detection data included in the first ECC data portion $138_1$. Responsive to the controller circuitry 110 not detecting errors in the encrypted data line 132, the data line 132 may be simultaneously or sequentially decrypted by the encryption/decryption circuitry 414 and verified using the MAC data 136 by the verification circuitry 416. If the controller circuitry 110 detects errors in the encrypted data line 132, the controller circuitry 110 fetches 470 the second portion of the ECC data $138_2$ from the sequestered, second memory circuitry portion 140 and, using the error correction data retrieved from the sequestered, second memory circuitry portion 140 and/or the first memory circuitry portion 130, repairs the encrypted data line 132. Responsive to a successful verification of the data line 132 by the verification circuitry 416, the decrypted data line 132 is returned 490 to the processor circuitry 150.

Figure 5:
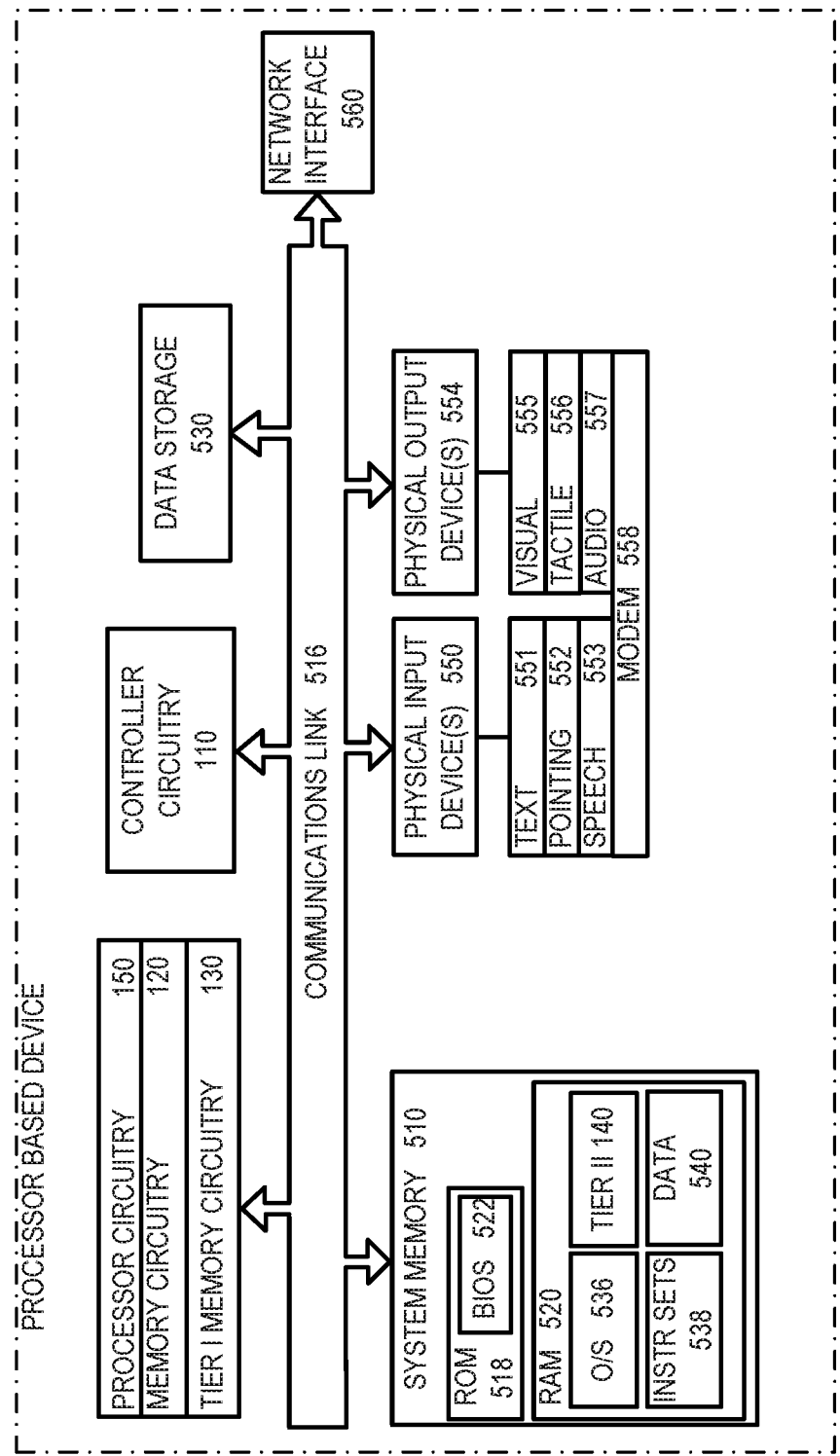
FIG. 5 and the following discussion provide a brief, general description of the components forming an illustrative processor-based device capable of implementing a scalable memory integrity and enhanced RAS system using sequestered memory such as depicted and described in detail in FIGS. 1-4 (above), in accordance with at least one embodiment described herein.

FIG. 5 and the following discussion provide a brief, general description of the components forming an illustrative processor-based device 500 capable of implementing a scalable memory integrity and enhanced RAS system using sequestered memory such as depicted and described in detail in FIGS. 1-4 (above), in accordance with at least one embodiment described herein. The processor-based device 500 includes processor circuitry 150. The processor circuitry 150 executes one or more applications. During execution, the applications may cause the processor circuitry 150 to perform one or more memory operations, such as a memory write operation or a memory read operation. As depicted in FIG. 5, in some embodiments, the processor circuitry 150 may include memory circuitry 120, for example as processor cache circuitry. In embodiments, the processor memory circuitry 120 may include some or all of the first memory circuitry portion 130. As depicted in FIG. 5, in embodiments, system memory circuitry 510 may include some or all of the sequestered, second memory circuitry portion 140. Although not depicted in FIG. 5, in other embodiments, the processor memory circuitry 120 may provide all or a portion of the sequestered, second memory circuitry portion 140. For example, processor memory circuitry 120, such as L1 cache memory circuitry may be used to provide all or a portion of the first memory circuitry portion 130 and LLC cache memory circuitry may be used to provide all or a portion of the sequestered, second memory circuitry portion 140. Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The processor circuitry 150 and/or the controller circuitry 110 may include any number of circuits, some or all of which may include programmable and/or configurable combinations of electronic components, semiconductor devices, and/or logic elements that are disposed partially or wholly in a PC, server, or other computing system capable of executing machine-readable instructions. The processor-based device 500 may include processor circuitry 150, and may, at times, include a bus or similar communications link 516 that communicatively couples and facilitates the exchange of information and/or data between various system components including a system memory 510 and the processor circuitry 150. The processor-based device 500 may be referred to in the singular herein, but this is not intended to limit the embodiments to a single device and/or system, since in certain embodiments, there will be more than one processor-based device 500 that incorporates, includes, or contains any number of communicably coupled, collocated, or remote networked circuits or devices.

The processor circuitry 150 may include any number, type, or combination of devices. At times, the processor circuitry 150 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 5 are of conventional design. As a result, such blocks need not be described in further detail herein, as they will be understood by those skilled in the relevant art. The communications link 316 that interconnects at least some of the components of the processor-based device 500 may employ any known serial or parallel bus structures or architectures.

The system memory 510 may include read-only memory ("ROM") circuitry 518 and random access memory ("RAM") circuitry 520. A portion of the ROM circuitry 518 may be used to store or otherwise retain a basic input/output system ("BIOS") 522. The BIOS 522 provides basic functionality to the processor-based device 500, for example by causing the processor circuitry 150 to load an operating system 536, one or more machine-readable instruction sets 538, and/or data 540 from the RAM circuitry 520. In embodiments, at least some of the one or more machine-readable instruction sets cause the controller circuitry 110 to selectively provide the memory integrity performance enhancement system as described herein.

The processor-based device 500 may include one or more communicably coupled, non-transitory, data storage devices 530. Although depicted in FIG. 5 as disposed internal to the processor-based device 500, in various embodiments, the one or more data storage devices 530 may be disposed local to and/or remote from the processor-based device 500. The one or more data storage devices 530 may include any current or future developed storage appliances, networks, and/or devices. Non-limiting examples of such data storage devices 530 may include, but are not limited to, any current or future developed non-transitory storage appliances or devices, such as one or more magnetic storage devices, one or more optical storage devices, one or more solid-state electromagnetic storage devices, one or more electro-resistive storage devices, one or more molecular storage devices, one or more quantum storage devices, or various combinations thereof. In some implementations, the one or more data storage devices 530 may include one or more removable storage devices, such as one or more flash drives, flash memories, flash storage units, or similar appliances or devices capable of communicable coupling to and decoupling from the processor-based device 500.

The one or more storage devices 530 may include interfaces or controllers (not shown in FIG. 5) communicatively coupling the respective storage device 530 or system to the communications link 316. The one or more storage devices 530 may contain machine-readable instruction sets, data structures, program modules, data stores, databases, logical structures, and/or other data useful to the processor circuitry 150 and/or the controller circuitry 110. In some instances, one or more external storage devices 530 may be communicably coupled to the processor circuitry 150, for example via communications link 310 or via one or more wired communications interfaces (e.g., Universal Serial Bus or USB); one or more wireless communications interfaces (e.g., Bluetooth®, Near Field Communication or NFC); one or more wired network interfaces (e.g., IEEE 802.3 or Ethernet); and/or one or more wireless network interfaces (e.g., IEEE 802.11 or WiFi®).

Machine-readable instruction sets 538 and data 540 may be stored in whole or in part in the system memory 510. Such instruction sets 538 may be transferred, in whole or in part, from one or more internal data storage devices and/or one or more external storage devices 530. The instruction sets 538 may be loaded, stored, or otherwise retained in system memory 510, in whole or in part, during execution by the processor circuitry 150. The machine-readable instruction sets 538 may include machine-readable and/or processor-readable code, instructions, or similar logic capable of providing the memory integrity performance enhancement functions and capabilities described herein.

For example, the one or more machine-readable instruction sets 538 may cause the controller circuitry 110 to, in response to a write operation received from the processor circuitry 150, encrypt and generate message authentication code (MAC) data 136 associated with the data line 132 to be written to the memory circuitry 120. The instruction sets 538 may further cause the controller circuitry to generate error correction code data 138 associated with the encrypted data line 132. The instruction sets 538 may further cause the controller circuitry 110 to write First Tier metadata 134, including the MAC data 136 and a first ECC data portion 138$_1$ (error detection data+(optionally) partial error correction data) to the first memory circuitry portion 130. The instruction sets 538 may further cause the controller circuitry 110 to write Second Tier metadata 142, including a second ECC data portion 138$_2$ (full or partial error correction data) to the sequestered, second memory circuitry portion 140.

The one or more machine-readable instruction sets 538 may cause the controller circuitry 110 to, in response to a read operation received from the processor circuitry 150, to retrieve the First Tier metadata 134, including the MAC data 136 and a first ECC data portion $138_1$ (error detection data+(optionally) partial error correction data) from the first memory circuitry portion 130. The instruction sets 538 may further cause the controller circuitry 110 to detect the presence of errors in the encrypted data line 132 using the error detection data included in the first ECC data portion $138_1$. Responsive to detecting an error in the encrypted data line 132, the instruction sets 538 may further cause the controller circuitry 110 to fetch the second ECC data portion $138_2$ from the sequestered, second memory circuitry portion 140 and correct the errors in the encrypted data line 132 using the error correction data included in the first ECC data portion $138_1$ and the second ECC data portion of $138_2$. Responsive to detecting no errors in the encrypted data line 132 or after repairing the errors present in the encrypted data line 132, the instruction sets 538 may cause the controller circuitry 110 to simultaneously or sequentially decrypt the encrypted data line 132 and verify the data included in the data line 132 using the MAC data 136 included in the first ECC data portion $138_1$. Responsive to a successful verification of the data line 132, the instruction sets 538 may cause the controller circuitry 110 to forward the data line 132 to the processor circuitry 150. Responsive to an unsuccessful verification of the data line 132, the instruction sets 538 may cause the controller circuitry 110 to generate an exception and/or return a null value to the processor circuitry 150.

Processor-based device users may provide, enter, or otherwise supply commands (e.g., acknowledgements, selections, confirmations, and similar) as well as information and/or data (e.g., subject identification information, color parameters) to the processor-based device 500 using one or more communicatively coupled physical input devices 550 such as one or more text entry devices 551 (e.g., keyboard), one or more pointing devices 552 (e.g., mouse, trackball, touchscreen), and/or one or more audio input devices 553. Some or all of the physical input devices 550 may include a wired or a wireless communicable coupling to the processor-based device 500.

Processor-based device users may receive output from the processor-based device 500 via one or more physical output devices 554. In at least some implementations, the one or more physical output devices 554 may include but are not limited to one or more: video output or display devices 555; tactile output devices 556; audio output devices 557, or combinations thereof. Some or all of the physical input devices 550 and some or all of the physical output devices 554 may be communicatively coupled to the processor-based device 500 via one or more wired or wireless interfaces.

For convenience, a network interface 560, the processor circuitry 150, the controller circuitry 110, the system memory 510, the physical input devices 550 and the physical output devices 554 are illustrated as communicatively coupled to each other via the communications link 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In some embodiments, all or a portion of the communications link 516 may be omitted and the components are coupled directly to each other using suitable wired or wireless connections.

Figure 6:
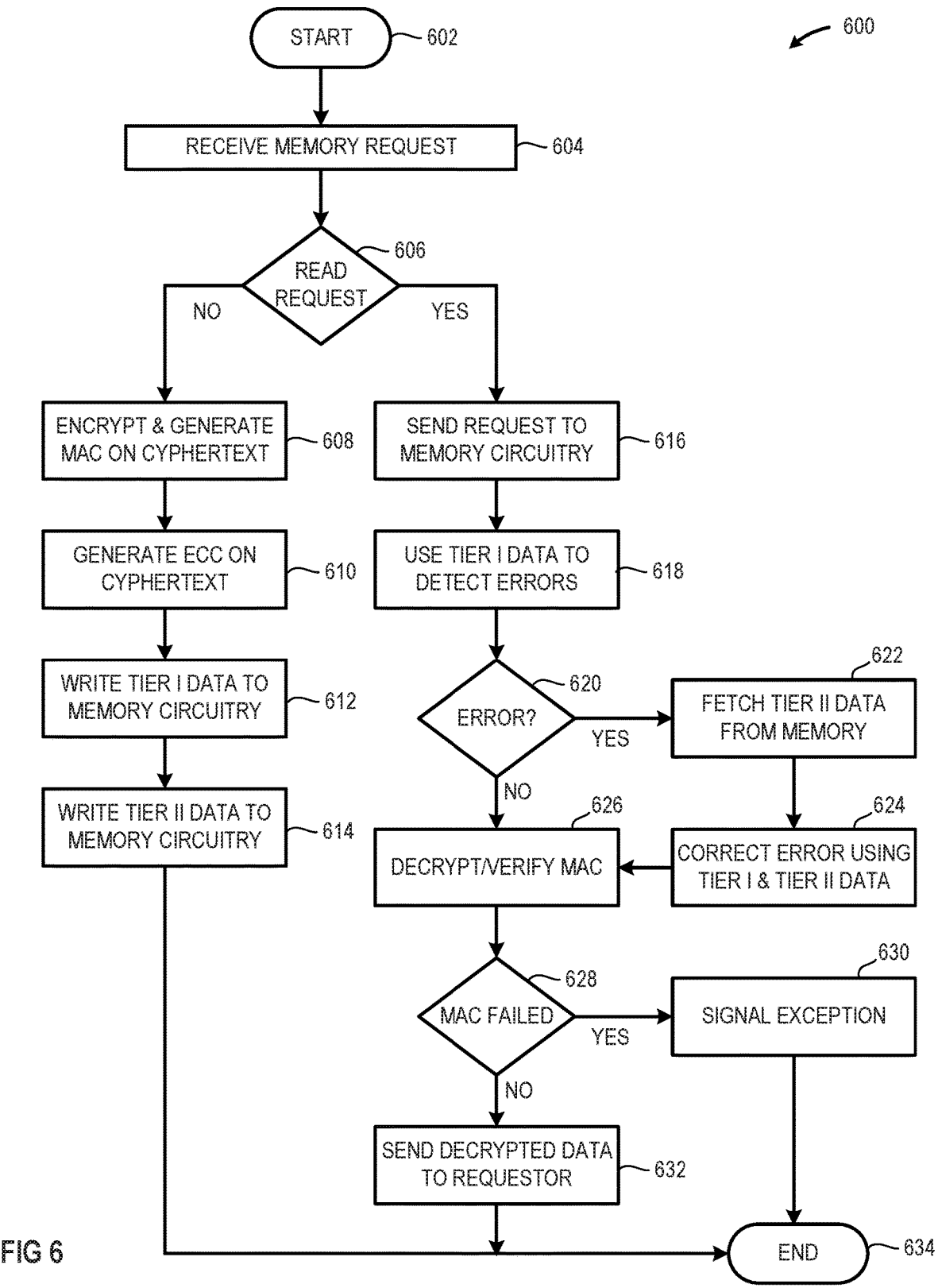
FIG. 6 is a high-level logic flow diagram of an illustrative memory integrity performance enhancement method, in accordance with at least one embodiment described herein.

FIG. 6 is a high-level logic flow diagram of an illustrative memory integrity performance enhancement method 600, in accordance with at least one embodiment described herein. The method 600 commences at 602.

At 604, the controller circuitry 110 receives a memory access request from the processor circuitry 150. In at least some embodiments, the memory access request may be generated by one or more applications executed by the processor circuitry 150.

At 606, the controller circuitry 110 determines whether the received memory access request includes a read request. Responsive to a determination by the controller circuitry 110 that the received memory access request IS NOT a read request, the method 600 continues at 608. Responsive to a determination by the controller circuitry 110 that the received memory access request IS a read request, the method 600 continues at 616.

At 608, responsive to a determination by the controller circuitry 110 that the received memory access request IS NOT a read request, the controller circuitry 110 encrypts the received data line 132 and generates MAC data 136 for the encrypted data line 132.

At 610, the controller circuitry 110 generates error correction code (ECC) data 138 for the encrypted data line 132. In embodiments, the ECC data 138 includes error detection data (e.g., 64 bit error detection data) and error correction data (e.g., 32 bit error correction data).

At 612, the controller circuitry 110 writes the encrypted data line 132, and First Tier metadata 134 including the MAC data 136 and the first portion of the ECC data $138_1$ to the first memory circuitry portion 130. In embodiments, the first ECC data portion of the $138_1$ may include error detection data and, optionally, partial error correction data.

At 614, the controller circuitry 110 writes Second Tier metadata 142 including all or a portion of the second ECC data portion $138_2$ to the sequestered, second memory circuitry portion 140. In embodiments, the second ECC data portion $138_2$ may include some or all of the error correction data. The method 600 then concludes at 634.

At 616, responsive to a determination by the controller circuitry 110 that the received memory access request IS a read request, the controller circuitry 110, communicates the read request to the memory circuitry 120. The read request retrieves the encrypted data line 132 and the First Tier metadata 134 (including the MAC data 136 and the first portion of the ECC data $138_1$ along with any other data such as multi-level tag and state data) from the first memory circuitry portion 130.

At 618, using the error detection data included in the first portion of the ECC data $138_1$, the controller circuitry 110 determines whether errors exist in the retrieved, encrypted data line 132.

At 620, if the controller circuitry 110 detects errors in the encrypted data line 132, the method 600 continues at 622. If the controller circuitry 110 fails to detect errors in the encrypted data line, the method 600 continues at 626.

At 622, responsive to a determination by the controller circuitry 110 that the encrypted data line 132 contains errors, the controller circuitry 110 fetches the Second Tier metadata 142, including the second ECC data portion $138_2$ (including the remaining portion of the error correction data) from the sequestered, second memory circuitry portion 140.

At 624, the controller circuitry 110 corrects the encrypted data line 132 using the error correction data included in the first ECC code portion $138_1$ and/or the second ECC code portion $138_2$.

At 626, the controller circuitry 110 simultaneously or sequentially decrypts the encrypted data line 132 and, using the MAC data 136 included in the First Tier metadata 134 and retrieved from the first memory circuitry portion 130, verifies the data line 132.

At 628, the controller circuitry 110 determines whether the verification of the data line 132 has failed or succeeded. Responsive to a successful verification of the data line 132 by the controller circuitry 110, the method 600 continues at 632. Responsive to an unsuccessful verification of the data line 132 by the controller circuitry 110, the method 600 continues at 630.

At 630, responsive to an unsuccessful verification of the data line 132 at 628, the controller circuitry 110 signals an exception and may return a null value to the processor circuitry. The method 600 then concludes at 634.

At 632, responsive to a successful verification of the data line 132 at 628, the controller circuitry 110 communicates the decrypted data line 132 to the processor circuitry 150. The method 600 then concludes at 634.

While FIG. 6 illustrates various operations according to one or more embodiments, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for providing a scalable memory integrity and enhanced RAS using sequestered memory. A write request causes controller circuitry to write an encrypted data line and First Tier metadata including MAC data and a first portion of ECC data (error detection) to a first memory circuitry portion and a second portion of ECC data (error correction) to sequestered, second memory circuitry portion. A read request causes the controller circuitry to read the encrypted data line and the First Tier metadata from the first memory circuitry portion. Using the first portion of the ECC data included in the First Tier metadata the controller circuitry determines if an error exists in the encrypted data line. If no error is detected, the controller circuitry decrypts and verifies the data line using the MAC data. If an error in the data line is detected by the controller circuitry, the second portion of the ECC data is fetched from the sequestered, second memory circuitry portion and the error corrected.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing scalable memory integrity and enhanced RAS using sequestered memory.

According to example 1 a data storage system. The system may include: memory circuitry; controller circuitry to, for each of a plurality of lines of data stored in memory circuitry: generate metadata that includes: data representative of a cryptographic message authentication code associated with the respective line of data; and data representative of an error code associated with the respective line of data, the error correction code including at least error detection data associated with the respective line of data and error correction data associated with the respective line of data; and apportion the metadata into a First Tier metadata portion stored in a first memory circuitry portion proximate the respective line of data in the memory circuitry and a Second Tier metadata portion stored in a sequestered, second memory circuitry portion remote from the respective line of data; wherein the First Tier metadata portion includes at least the error detection data portion and the message authentication code portion associated with the respective line of data; and wherein the Second Tier metadata portion includes at least a portion of the error correction data portion associated with the respective line of data.

Example 2 may include elements of example 1, and the controller circuitry may further: responsive to receipt of a read operation generated by an application executed by processor circuitry: retrieve the requested line of data and the First Tier metadata portion from the first memory circuitry portion; determine whether an error exists in the requested line of data using the error detection data portion included in the First Tier metadata portion and associated with the requested line of data; and decrypt the requested line of data responsive to a determination that the requested line of data contains no errors.

Example 3 may include elements of any of claim 1 or 2 and the controller circuitry may further: verify the requested line of data using the message authentication code portion included in the First Tier metadata portion, responsive to no error being present in the requested line of data; and responsive to a successful verification of the requested line of data, forward the requested line of data to the processor circuitry.

Example 4 may include elements of any of examples 1 through 3 and the controller circuitry may further: generate a security exception responsive to an unsuccessful verification of the requested line of data.

Example 5 may include elements of any of examples 1 through 4 and the controller circuitry may further: retrieve the Second Tier metadata portion from the sequestered, second memory portion responsive to a determination that the requested line of data contains an error; and correct the error in the requested line of data using the error correction data portion included in the Second Tier metadata portion.

Example 6 may include elements of any of examples 1 through 5 where at least a portion of the memory circuitry comprises cache memory circuitry.

Example 7 may include elements of any of examples 1 through 6 where the first portion of memory circuitry to store the First Tier metadata comprises memory circuitry capable of providing up to 128 bits of storage.

Example 8 may include elements of any of examples 1 through 7 where the second portion of memory circuitry to store the Second Tier metadata comprises memory circuitry capable of providing up to 64 bits of storage.

According to example 9, there is provided a data storage method. The method may include: generating, by controller circuitry, metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and apportioning, by the controller circuitry, the metadata into a First Tier metadata portion stored in a first memory circuitry portion proximate the respective line of data and a Second Tier metadata portion stored in a sequestered, second memory circuitry portion remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

Example 10 may include elements of example 9, and the method may further include: responsive to receipt of a read operation generated by an application executed by processor circuitry: retrieving, by the controller circuitry, the requested line of data and the First Tier metadata portion from the first memory circuitry portion; determining, by the controller circuitry, whether an error exists in the requested line of data using the error detection data portion included in the First Tier metadata portion and associated with the requested line of data; and decrypting, by the controller circuitry, the requested line of data responsive to a determination that the requested line of data contains no errors.

Example 11 may include elements of any of examples 9 or 10 and the method may further include: verifying, by the controller circuitry, the requested line of data using the message authentication code portion included in the First Tier metadata portion, responsive to no error being present in the requested line of data; and, responsive to a successful verification of the requested line of data, transferring the requested line of data to the processor circuitry.

Example 12 may include elements of any of examples 9 through 11 and the method may further include: generating, by the controller circuitry, a security exception responsive to an unsuccessful verification of the requested line of data.

Example 13 may include elements of any of examples 9 through 12 and the method may further include: retrieving, by the controller circuitry, the Second Tier metadata portion from the sequestered, second memory circuitry portion responsive to a determination that the requested line of data contains an error; and correcting, by the controller circuitry, the error in the requested line of data using the error correction data portion included in the Second Tier metadata portion.

According to example 14, there is provided a non-transitory storage device that includes instructions. The instructions, when executed by controller circuitry, cause the controller circuitry to: generate metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and apportion the metadata into a First Tier metadata portion stored in a first memory circuitry portion proximate the respective line of data and a Second Tier metadata portion stored in a sequestered, second memory circuitry portion remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

Example 15 may include elements of example 14 where the instructions, when executed by the controller circuitry, cause the controller circuitry to further: responsive to receipt of a read operation generated by an application executed by processor circuitry: retrieve the requested line of data and the First Tier metadata portion from the first memory circuitry portion; determine whether an error exists in the requested line of data using the error detection data portion included in the First Tier metadata portion and associated with the requested line of data; and decrypt the requested line of data responsive to a determination that the requested line of data contains no errors.

Example 16 may include elements of any of examples 14 or 15 where the instructions, when executed by the controller circuitry, cause the controller circuitry to further: verify the requested line of data using the message authentication code portion included in the First Tier metadata portion, responsive to no error being present in the requested line of data; and, responsive to a successful verification of the requested line of data, transfer the requested line of data to the processor circuitry.

Example 17 may include elements of any of examples 14 through 16 where the instructions, when executed by the controller circuitry, cause the controller circuitry to further: generate a security exception responsive to an unsuccessful verification of the requested line of data.

Example 18 may include elements of any of examples 14 through 17 where the instructions, when executed by the controller circuitry, cause the controller circuitry to further: retrieve the Second Tier metadata portion from the sequestered, second memory portion responsive to a determination that the requested line of data contains an error; and correct the error in the requested line of data using the error correction data portion included in the Second Tier metadata portion.

According to example 19, there is provided a data storage system. The system may include: means for generating metadata for each respective one of a plurality of lines of data stored in memory circuitry the metadata including: data representative of a cryptographic message authentication code (MAC) associated with the respective line of data; and data representative of an error correction code (ECC) associated with the respective line of data, the error correction code including at least error detection data associated with the respective line of data and error correction data associated with the respective line of data; and means for apportioning the metadata into a First Tier metadata portion stored in a first memory circuitry portion proximate the respective line of data and a Second Tier metadata portion stored in a sequestered, second memory circuitry portion remote from the respective line of data; wherein the First Tier metadata portion includes at least the error detection data portion and the message authentication code portion of the metadata associated with the respective line of data; and wherein the Second Tier metadata portion includes at least a portion of the error correction data portion of the metadata associated with the respective line of data.

Example 20 may include elements of example 19 and the system may further include: means for retrieving the requested line of data and the First Tier metadata portion from the first memory circuitry portion responsive to receipt of a read operation generated by an application executed by processor circuitry; means for determining whether an error exists in the requested line of data using the error detection data portion included in the First Tier metadata portion and associated with the requested line of data; and means for decrypting the requested line of data responsive to a determination that the requested line of data contains no errors.

Example 21 may include elements of any of examples 19 or 20 and the system may further include: means for verifying the requested line of data using the message authentication code portion included in the First Tier metadata portion, responsive to no error being present in the requested line of data; and means for transferring the requested line of data to the processor circuitry responsive to a successful verification of the requested line of data.

Example 22 may include elements of any of examples 19 through 21 and the system may further include: means for generating a security exception responsive to an unsuccessful verification of the requested line of data.

Example 23 may include elements of any of examples 19 through 22 and the system may further include: means for retrieving the Second Tier portion of the metadata from the second memory location responsive to a determination that the requested line of data contains an error; and means for correcting the error in the requested line of data using the error correction data portion included in the Second Tier metadata portion.

According to example 24, there is provided a system for providing scalable memory integrity and enhanced RAS using sequestered memory, the system being arranged to perform the method of any of examples 9 through 13.

According to example 25, there is provided a chipset arranged to perform the method of any of examples 9 through 13.

According to example 26, there is provided at least one, non-transitory, machine readable medium comprising a plurality of instructions that, in response to be being executed on a computing device, cause the computing device to carry out the method according to any of examples 9 through 13.

According to example 27, there is provided a device configured for providing scalable memory integrity and enhanced RAS using sequestered memory, the device being arranged to perform the method of any of the examples 9 through 13.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A data storage system, comprising:
   memory circuitry;
   controller circuitry to, for a respective line of data of a plurality of lines of data stored in memory circuitry:
      generate metadata that includes:
         first data representative of a cryptographic message authentication code associated with the respective line of data; and
         second data representative of an error correction code associated with the respective line of data, the error correction code including at least an error detection data portion associated with the respective line of data and an error correction data portion associated with the respective line of data; and
      apportion the metadata into a First Tier metadata portion stored in a first memory circuitry portion proximate the respective line of data in the memory circuitry and a Second Tier metadata portion stored in a sequestered, second memory circuitry portion remote from the respective line of data;
      wherein the First Tier metadata portion includes at least the error detection data portion and the first data representative of the message authentication code associated with the respective line of data; and
      wherein the Second Tier metadata portion includes at least a portion of the error correction data portion associated with the respective line of data.

2. The data storage system of claim 1, the controller circuitry to further:
responsive to receipt of a read operation generated by an application executed by processor circuitry:
retrieve the First Tier metadata portion and a requested line of data corresponding to the respective line of data from the first memory circuitry portion;
determine whether an error exists in the requested line of data using the error detection data portion included in the First Tier metadata portion and associated with the requested line of data; and
decrypt the requested line of data responsive to a determination that the requested line of data contains no errors.

3. The data storage system of claim 2, the controller circuitry to further:
verify the requested line of data using the first data representative of the message authentication code included in the First Tier metadata portion, responsive to no error being present in the requested line of data; and
responsive to a successful verification of the requested line of data, forward the requested line of data to the processor circuitry.

4. The data storage system of claim 3, the controller circuitry to further:
generate a security exception responsive to an unsuccessful verification of the requested line of data.

5. The data storage system of claim 2, the controller circuitry to further:
retrieve the Second Tier metadata portion from the sequestered, second memory portion responsive to a determination that the requested line of data contains an error; and
correct the error in the requested line of data using the error correction data portion included in the Second Tier metadata portion.

6. The data storage system of claim 1 wherein at least a portion of the memory circuitry comprises cache memory circuitry.

7. The data storage system of claim 1 wherein the first memory circuitry portion to store the First Tier metadata portion comprises memory circuitry capable of providing up to 128 bits of storage.

8. The data storage system of claim 1 wherein the sequestered, second memory circuitry portion to store the Second Tier metadata portion comprises memory circuitry capable of providing up to 64 bits of storage.

9. A data storage method, comprising:
generating, by controller circuitry, metadata for a respective line of data of a plurality of lines of data stored in memory circuitry, the metadata including:
first data representative of a cryptographic message authentication code (MAC) associated with the respective line of data; and
second data representative of an error correction code (ECC) associated with the respective line of data, the error correction code including at least an error detection data portion associated with the respective line of data and an error correction data portion associated with the respective line of data; and
apportioning, by the controller circuitry, the metadata into a First Tier metadata portion stored in a first memory circuitry portion proximate the respective line of data and a Second Tier metadata portion stored in a sequestered, second memory circuitry portion remote from the respective line of data;
wherein the First Tier metadata portion includes at least the error detection data portion and the first data representative of the message authentication code associated with the respective line of data; and
wherein the Second Tier metadata portion includes at least a portion of the error correction data portion of the metadata associated with the respective line of data.

10. The data storage method of claim 9, further comprising:
responsive to receipt of a read operation generated by an application executed by processor circuitry:
retrieving, by the controller circuitry, the First Tier metadata portion and a requested line of data corresponding to the respective line of data from the first memory circuitry portion;
determining, by the controller circuitry, whether an error exists in the requested line of data using the error detection data portion included in the First Tier metadata portion and associated with the requested line of data; and
decrypting, by the controller circuitry, the requested line of data responsive to a determination that the requested line of data contains no errors.

11. The data storage method of claim 10, further comprising:
verifying, by the controller circuitry, the requested line of data using the first data representative of the message authentication code included in the First Tier metadata portion, responsive to no error being present in the requested line of data; and
responsive to a successful verification of the requested line of data, transferring the requested line of data to the processor circuitry.

12. The data storage method of claim 11, further comprising:
generating, by the controller circuitry, a security exception responsive to an unsuccessful verification of the requested line of data.

13. The data storage method of claim 10, further comprising:
retrieving, by the controller circuitry, the Second Tier metadata portion from the sequestered, second memory circuitry portion responsive to a determination that the requested line of data contains an error; and
correcting, by the controller circuitry, the error in the requested line of data using the error correction data portion included in the Second Tier metadata portion.

14. A non-transitory storage device that includes instructions, that when executed by controller circuitry, cause the controller circuitry to:
generate metadata for a respective line of data of a plurality of lines of data stored in memory circuitry, the metadata including:
first data representative of a cryptographic message authentication code (MAC) associated with the respective line of data; and
second data representative of an error correction code (ECC) associated with the respective line of data, the error correction code including at least an error detection data portion associated with the respective line of data and an error correction data portion associated with the respective line of data; and
apportion the metadata into a First Tier metadata portion stored in a first memory circuitry portion proximate the respective line of data and a Second Tier metadata portion stored in a sequestered, second memory circuitry portion remote from the respective line of data;

wherein the First Tier metadata portion includes at least the error detection data portion and the first data representative of the message authentication code associated with the respective line of data; and wherein the Second Tier metadata portion includes at least a portion of the error correction data portion of the metadata associated with the respective line of data.

15. The non-transitory storage device of claim 14 wherein the instructions, when executed by the controller circuitry, cause the controller circuitry to further:

responsive to receipt of a read operation generated by an application executed by processor circuitry:

retrieve the First Tier metadata portion and a requested line of data corresponding to the respective line of data from the first memory circuitry portion;

determine whether an error exists in the requested line of data using the error detection data portion included in the First Tier metadata portion and associated with the requested line of data; and decrypt the requested line of data responsive to a determination that the requested line of data contains no errors.

16. The non-transitory storage device of claim 15 wherein the instructions, when executed by the controller circuitry, cause the controller circuitry to further:

verify the requested line of data using the first data representative of the message authentication code included in the First Tier metadata portion, responsive to no error being present in the requested line of data; and responsive to a successful verification of the requested line of data, transfer the requested line of data to the processor circuitry.

17. The non-transitory storage device of claim 15 wherein the instructions, when executed by the controller circuitry, cause the controller circuitry to further:

generate a security exception responsive to an unsuccessful verification of the requested line of data.

18. The non-transitory storage device of claim 15 wherein the instructions, when executed by the controller circuitry, cause the controller circuitry to further:

retrieve the Second Tier metadata portion from the sequestered, second memory portion responsive to a determination that the requested line of data contains an error; and correct the error in the requested line of data using the error correction data portion included in the Second Tier metadata portion.

19. A data storage system, comprising:

means for generating metadata for a respective line of data of a plurality of lines of data stored in memory circuitry, the metadata including:

first data representative of a cryptographic message authentication code (MAC) associated with the respective line of data; and second data representative of an error correction code (ECC) associated with the respective line of data, the error correction code including at least an error detection data portion associated with the respective line of data and an error correction data portion associated with the respective line of data; and means for apportioning the metadata into a First Tier metadata portion stored in a first memory circuitry portion proximate the respective line of data and a Second Tier metadata portion stored in a sequestered, second memory circuitry portion remote from the respective line of data;

wherein the First Tier metadata portion includes at least the error detection data portion and the first data representative of the message authentication code associated with the respective line of data; and wherein the Second Tier metadata portion includes at least a portion of the error correction data portion of the metadata associated with the respective line of data.

20. The data storage system of claim 19, further comprising:

means for retrieving the First Tier metadata portion and a requested line of data corresponding to the respective line of data from the first memory circuitry portion responsive to receipt of a read operation generated by an application executed by processor circuitry;

means for determining whether an error exists in the requested line of data using the error detection data portion included in the First Tier metadata portion and associated with the requested line of data; and means for decrypting the requested line of data responsive to a determination that the requested line of data contains no errors.

21. The data storage system of claim 20, further comprising:

means for verifying the requested line of data using the first data representative of the message authentication code included in the First Tier metadata portion, responsive to no error being present in the requested line of data; and means for transferring the requested line of data to the processor circuitry responsive to a successful verification of the requested line of data.

22. The data storage system of claim 21, further comprising:

means for generating a security exception responsive to an unsuccessful verification of the requested line of data.

23. The data storage system of claim 20, further comprising:

means for retrieving the Second Tier metadata portion from the sequestered, second memory circuitry portion responsive to a determination that the requested line of data contains an error; and means for correcting the error in the requested line of data using the error correction data portion included in the Second Tier metadata portion.

* * * * *